(12) United States Patent
Sheeley

(10) Patent No.: US 8,449,299 B1
(45) Date of Patent: May 28, 2013

(54) TEACHING DEVICE AND METHOD

(76) Inventor: Barbara R. Sheeley, Hilton Head Island, SC (US)

(*) Notice: Subject to any disclaimer, the term of this patent is extended or adjusted under 35 U.S.C. 154(b) by 2463 days.

(21) Appl. No.: 11/210,041

(22) Filed: Aug. 23, 2005

Related U.S. Application Data

(60) Provisional application No. 60/603,587, filed on Aug. 23, 2004.

(51) Int. Cl.
*G09B 19/02* (2006.01)

(52) U.S. Cl.
USPC .......................................................... 434/203

(58) Field of Classification Search
USPC ................. 434/188, 191, 200, 203, 207, 246
See application file for complete search history.

(56) References Cited

U.S. PATENT DOCUMENTS

| | | | | |
|---|---|---|---|---|
| 378,866 | A * | 3/1888 | Clark | 434/203 |
| 1,187,353 | A * | 6/1916 | McBride | 434/246 |
| 1,372,087 | A | 3/1921 | Roddy | |
| 2,562,633 | A | 7/1951 | Needham | |
| 2,708,797 | A * | 5/1955 | Hamer | 434/203 |
| 3,204,343 | A | 9/1965 | Pollock | |
| 3,357,116 | A | 12/1967 | Bazacos | |
| 3,381,394 | A | 5/1968 | Munro | |
| 4,034,486 | A | 7/1977 | Mills | |
| 4,096,644 | A | 6/1978 | Nesher et al. | |
| 4,210,093 | A | 7/1980 | Baker | |
| 4,912,307 | A | 3/1990 | Shade et al. | |
| 4,993,952 | A | 2/1991 | Yeh | |
| 5,377,998 | A * | 1/1995 | Schainbaum | 273/459 |
| 5,395,245 | A | 3/1995 | Heinz | |
| 6,171,111 | B1 * | 1/2001 | Buckner | 434/203 |
| 6,442,972 | B1 * | 9/2002 | Watson | 63/38 |
| 6,561,415 | B2 | 5/2003 | Grant | |
| 6,712,614 | B1 * | 3/2004 | Henderson | 434/203 |
| 7,313,929 | B2 * | 1/2008 | Lazor | 63/3 |

FOREIGN PATENT DOCUMENTS

| | | | |
|---|---|---|---|
| WO | WO 90/04243 | * | 4/1990 |
| WO | WO 94/12965 | | 6/1994 |

* cited by examiner

*Primary Examiner* — Kurt Fernstrom
(74) *Attorney, Agent, or Firm* — Allen, Dyer, Doppelt, Milbrath & Gilchrist, P.A.

(57) ABSTRACT

A multielement linear array for teaching a person to count comprises a first set of four linearly arranged elements of first and second types A and B, arranged in a first pattern A-B-A-B. In the description herein, the term "linear" is intended to be construed to mean that the elements are arranged sequentially, and therefore are topologically linear, not that the device itself must assume a linear form. A third element C is positioned to follow the first set. A second set of four linearly arranged elements of the first and the second types A and B are arranged in a second pattern B-A-B-A, and are positioned to follow the third element. A fourth element D is positioned to follow the second set. Preferably the elements A, B, C, and D are mutually distinguishable, for example, by at least one of color and shape.

16 Claims, 1 Drawing Sheet

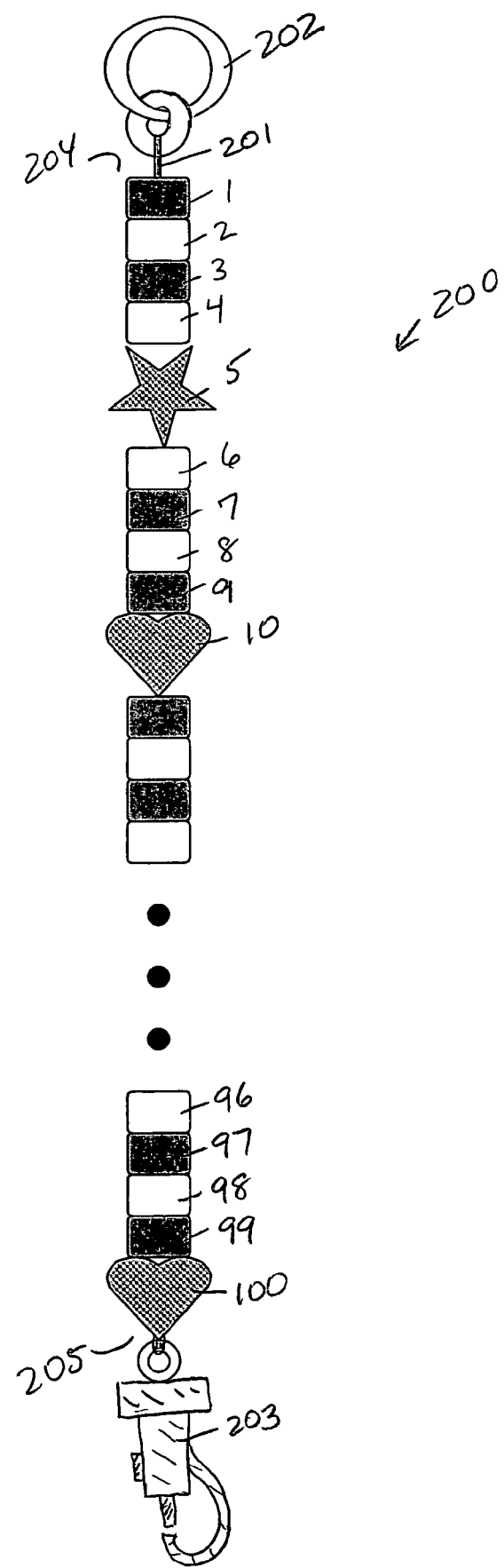

TEACHING DEVICE AND METHOD

CROSS-REFERENCE TO RELATED APPLICATION

This application claims priority to provisional application Ser. No. 60/603,587, filed on Aug. 23, 2004, entitled "Teaching Device and Method."

FIELD OF INVENTION

The invention relates to teaching aids and in particular to a counting device and method employing elements carried within a repeatable pattern and having unique characteristics for learning to count.

SUMMARY

The present invention is directed to a teaching aid and method of use, for example for learning to count. In the present invention, elements such as beads having distinguishable characteristics such as color and shape are combined within a selected and repeatable pattern for learning to count.

A multielement linear array for teaching a person to count comprises a first set of four linearly arranged elements of first and second types A and B, arranged in a first pattern A-B-A-B. In the description herein, the term "linear" is intended to be construed to mean that the elements are arranged sequentially, and therefore are topologically linear, not that the device itself must assume a linear form.

A third element C is positioned to follow the first set. A second set of four linearly arranged elements of the first and the second types A and B are arranged in a second pattern B-A-B-A, and are positioned to follow the third element. A fourth element D is positioned to follow the second set. Preferably the elements A, B, C, and D are mutually distinguishable, for example, by at least one of color and shape.

BRIEF DESCRIPTION OF THE DRAWING

THE FIGURE illustrates one embodiment of the present invention comprising multicolored and multishaped beads carried on a string within a pattern consistent with the teachings of the present invention.

DETAILED DESCRIPTION OF THE PREFERRED EMBODIMENT

A description of the preferred embodiments of the present invention will now be presented with reference to THE FIGURE. The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

By way of example and as illustrated with reference to THE FIGURE, one embodiment of the invention includes a string 200 of beads suspended, for example, on a string 201 between a key ring 202 and a hook 203 having sufficient number of beads for counting to 100. The device 200 may be viewed as comprising an element type, pattern of elements, and colors and shapes for elements within the pattern. By way of example, the embodiment herein described makes use of cylindrical shaped beads having purple, white, or red coloring arranged in a pattern for enhancing the learning process of counting.

As illustrated with reference to Table 1, entitled "Count String Pattern" includes beads that may be arranged to provide a repeatable pattern or sequence. Table 1 illustrates a use of first and second element unique sequences combined to form a third unique sequence for learning to count to ten and thus combinations of ten, such as counting to one hundred, by way of example. Elements may have differing colors (purple, white, red) and shapes (cylinder, star, heart).

TABLE 1

| Counting Element Pattern | |
| --- | --- |
| Number | Element Type |
| 0 | |
| 1 | A |
| 2 | B |
| 3 | A |
| 4 | B |
| 5 | C |
| 6 | B |
| 7 | A |
| 8 | B |
| 9 | A |
| 10 | D |
| 11 | A |
| 12 | B |
| 13 | A |
| 14 | B |
| 15 | C |
| 16 | B |
| 17 | A |
| 18 | B |
| 19 | A |
| 20 | D |
| ... | ... |

A close look at the patterns will reveal that, in a first series, by way of example, beads 1-5 have the element types following a pattern of A-B-A-B-C, and a second pattern for beads 6-10 of B-A-B-A-D. These first and second patterns form a third pattern that is repeated for 11-20, 21-40, and so on. The switching of the A and B elements following a C or a D element permits that all the elements A and B retain their odd- and evenness, respectively.

The element types A, B, C, and D may take on various colors or shapes as desired. By way of example, the colors purple and white can be used for the A and B elements, respectively, while red can used for the C and D elements. Further, the A and B elements take on a cylindrical shape while the C and D are formed, respectively, as a star and a heart. It is anticipated that various shapes may be used rather then colors or alternatively similar shapes having various colors.

In a particular embodiment, the sequences are repeated so that 100 beads are strung in toto, with the key ring 202 and hook 203 at the first 204 and second 205 ends, respectively. In FIG. 1, the ellipsis represents beads 15-95, and the string 200 is shown as terminating with beads 96-100 in a pattern B-A-B-A-D.

The invention is also intended to embrace a method of teaching a person to count. The method comprises the step of providing a person desirous of learning to count with a multielement linear array for teaching a person to count such as that described above, although this is not intended as a limitation.

A manipulation of the first set is used to teach counting from one to five, and a manipulation of the second set is used to teach counting from six to ten. The entire array as described herein, for example, can be used to teach counting to 100.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which claims may be expressed.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A multielement linear array for teaching a person to count comprising:
   a first element emulating a zero;
   a first set of five linearly arranged elements of first, second, and third types A, B, and C, arranged in a first pattern A-B-A-B-C immediately following the zero element;
   a second set of five linearly arranged elements of the first and the second types A and B, and a fourth type D, arranged in a second pattern B-A-B-A-D, positioned to follow the first set; and
   wherein the zero, A, B, C, and D elements are mutually distinguishable.

2. The array recited in claim 1, wherein the elements A, B, C, and D are distinguishable by at least one of color and shape.

3. The array recited in claim 2, wherein the elements A and B have a substantially similar shape and differ in color.

4. The array recited in claim 2, wherein the elements C and D differ in shape from each other and from the elements A and B.

5. The array recited in claim 4, wherein the elements C and D have a substantially same color.

6. The array recited in claim 1, wherein the linear array comprises a repeating pattern of A-B-A-B-C-B-A-B-A-D elements.

7. The array recited in claim 6, wherein the linear array comprises a total of 100 A, B, C, and D elements, arranged in ten of the repeating patterns.

8. The array recited in claim 1, wherein the array comprises a flexible elongated linear member, and the elements comprise beads strung on the linear member.

9. A method of teaching a person to count, comprising the steps of:
   providing a person desirous of learning to count with a multielement linear array for teaching a person to count, the array comprising:
      a first set of five linearly arranged elements of first, second, and third types A, B, and C, arranged in a first pattern A-B-A-B-C;
      a second set of five linearly arranged elements of the first and the second types A and B, and a fourth type C, arranged in a second pattern B-A-B-A-D, positioned to follow the first set; and
      wherein the elements A, B, C, and D are mutually distinguishable;
   using a manipulation of the first set to teach counting from one to five;
   using a manipulation of the second set to teach counting from six to ten;
   stringing the linearly arranged elements as beads on a string; and
   inserting before the first set of five linearly arranged elements an element emulating a zero.

10. The method recited in claim 9, wherein the elements A, B, C, and D are distinguishable by at least one of color and shape.

11. The method recited in claim 10, wherein the elements A and B have a substantially similar shape and differ in color.

12. The method recited in claim 10, wherein the elements C and D differ in shape from each other and from the elements A and B.

13. The method recited in claim 12, wherein the elements C and D have a substantially same color.

14. The method recited in claim 9, wherein the linear array comprises a repeating pattern of A-B-A-B-C-B-A-B-A-D elements, and further comprising the step of using a manipulation of the array elements to teach counting in sets of ten.

15. The method recited in claim 14, wherein the linear array comprises a total of 100 A, B, C, and D elements, arranged in ten of the repeating patterns, and further comprising the step of using a manipulation of the 100 elements to teach counting to 100.

16. The method recited in claim 9, wherein the array comprises a flexible elongated linear member, and the elements comprise beads strung on the linear member.

* * * * *